(12) United States Patent
Kerr

(10) Patent No.: US 11,349,268 B2
(45) Date of Patent: May 31, 2022

(54) POWER EXTENSION MODULE AND MODULAR ASSEMBLY THEREOF

(71) Applicant: NOVUS 48 LIMITED, Kircaldy (GB)

(72) Inventor: Chris Kerr, London (GB)

(73) Assignee: NOVUS 48 LIMITED, Kircaldy (GB)

( * ) Notice: Subject to any disclaimer, the term of this patent is extended or adjusted under 35 U.S.C. 154(b) by 0 days.

(21) Appl. No.: 17/422,432

(22) PCT Filed: Jan. 15, 2020

(86) PCT No.: PCT/GB2020/050076
§ 371 (c)(1),
(2) Date: Jul. 12, 2021

(87) PCT Pub. No.: WO2020/148532
PCT Pub. Date: Jul. 23, 2020

(65) Prior Publication Data
US 2022/0045465 A1   Feb. 10, 2022

(30) Foreign Application Priority Data

Jan. 15, 2019 (GB) .................................... 1900563

(51) Int. Cl.
*H02G 3/34* (2006.01)
*H01R 27/02* (2006.01)
(Continued)

(52) U.S. Cl.
CPC ........... *H01R 27/02* (2013.01); *H02G 3/0487* (2013.01); *H02G 3/34* (2013.01); *H02G 9/02* (2013.01); *H02G 3/185* (2013.01)

(58) Field of Classification Search
CPC ........ H01R 27/02; H01R 27/00; H01R 25/16; H01R 25/161; H01R 25/162;
(Continued)

(56) References Cited

U.S. PATENT DOCUMENTS 4,875,871 A * 10/1989 Booty, Sr. ............ H01R 25/162
174/72 C
6,045,374 A   4/2000 Candeloro
(Continued)

FOREIGN PATENT DOCUMENTS

| CN | 105789996 B | 11/2017 |
| JP | 2007151278 A | 6/2007 |
| TW | 200847571 A | 12/2008 |

OTHER PUBLICATIONS

Publication and Search Report (p. 27) under Section 17 for GB1900563.6 (the priority application for the present application).
(Continued)

*Primary Examiner* — Angel R Estrada

(57) ABSTRACT

An electrical power extension module comprising: a housing; a first retaining means for mechanical engagement with a first another electrical power extension module, the first retaining means being at a first end of the housing; a first electrical connector at the first end of the housing, the first electrical connector being configured for electrically connecting with a connector of the first another electrical module; a second retaining means for mechanical engagement with a second another electrical power extension module, the second retaining means being at a second end of the housing; a second electrical connector at the second end of the housing, the second electrical connector configured for electrically connecting with a connector of the second another module; and electrical conduction means located within the housing and connected between the first electrical connector and the second electrical connector and electrically connecting the first electrical connector with the second electrical connector.

12 Claims, 5 Drawing Sheets

(51) Int. Cl.
    *H02G 3/04*     (2006.01)
    *H02G 9/02*     (2006.01)
    *H02G 3/18*     (2006.01)

(58) Field of Classification Search
    CPC .......... H02G 3/0487; H02G 3/34; H02G 9/02;
                    H02G 3/185; H02G 9/04; H02G 3/04
    USPC .......... 174/480, 481, 68.1, 68.3, 72 R, 88 R,
                    174/70 C; 248/68.1; 439/488, 120, 209,
                    439/212, 216, 535, 638, 213
    See application file for complete search history.

(56) References Cited

U.S. PATENT DOCUMENTS

| | | | |
|---|---|---|---|
| 6,492,594 B1 * | 12/2002 | Magyar ................ | H02G 3/0487 |
| | | | 174/480 |
| 6,797,885 B2 | 9/2004 | Magyar et al. | |
| 8,309,850 B2 * | 11/2012 | Henry .................. | H01R 25/161 |
| | | | 174/68.1 |
| 8,616,921 B2 * | 12/2013 | Byrne .................. | H01R 25/003 |
| | | | 439/652 |
| 9,997,860 B1 | 6/2018 | Hernandez, Jr. | |
| 10,594,095 B2 * | 3/2020 | Strong .................. | H01R 25/16 |
| 10,886,681 B2 * | 1/2021 | Alexander ............. | H01R 35/04 |
| 2013/0146324 A1 | 6/2013 | Byrne et al. | |
| 2016/0079721 A1 | 3/2016 | Jones et al. | |
| 2018/0248325 A1 | 8/2018 | Strong | |
| 2018/0375317 A1 | 12/2018 | Dombrowski et al. | |

OTHER PUBLICATIONS

International Search Report for PCT/GB2020/050076.
Jan. 24, 2022 Australian Examination Report.
Translation of Chinese Office Action.

* cited by examiner

POWER EXTENSION MODULE AND MODULAR ASSEMBLY THEREOF

FIELD

This relates to power and lighting supply, and in particular but not exclusively to power and lighting supply for use in construction areas.

BACKGROUND

Construction projects—projects of building offices, residences, schools, hospitals etc.—require a supply of power and lighting and multiple outlet points for construction workers to access a supply of power and lighting. Existing power and lighting supplies for construction projects are not easily customisable to a particular construction project or alterable as the construction site on the project changes throughout the duration of the project.

Furthermore, known power and lighting systems for construction sites are rigged at height, typically at ceiling level. Such systems are inconvenient to install and remove, and rely on infrastructure in the construction area in order to be rigged.

There is therefore a need for an independent, customisable and versatile power and lighting supply for construction projects.

SUMMARY

A first aspect of this specification provides an electrical power extension module comprising: an elongate protective housing; a first retaining means for mechanical engagement with a first another electrical power extension module, the first retaining means being located at a first end of the elongate protective housing; a first electrical connector located at the first end of the housing, the first electrical connector being configured for electrically connecting with a connector of the first another electrical power extension module; a second retaining means for mechanical engagement with a second another electrical power extension module, the second retaining means being located at a second end of the housing; a second electrical connector located at the second end of the housing, the second electrical connector being configured for electrically connecting with a connector of the second another electrical power extension module; and electrical conduction means located within the housing and connected between the first electrical connector and the second electrical connector and electrically connecting the first electrical connector with the second electrical connector, wherein the elongate protective housing has a central portion which houses the electrical conduction means and side portions which include ramp profiles and which provide the housing with a greater width dimension on a lower surface of the housing compared to an upper surface of the housing. The ramp profiles may comprise a textured surface.

A second aspect of this specification provides an electrical power extension module comprising: a substantially non-deformable housing; a first retaining means for mechanical engagement with a first another electrical power extension module, the first retaining means being located at a first end of the housing; a first electrical connector located at the first end of the housing, the first electrical connector being configured for electrically connecting with a connector of the first another electrical power extension module; a second retaining means for mechanical engagement with a second another electrical power extension module, the second retaining means being located at a second end of the housing; a second electrical connector located at the second end of the housing, the second electrical connector being configured for electrically connecting with a connector of the second another electrical power extension module; electrical conduction means located within the housing and connected between the first electrical connector and the second electrical connector and electrically connecting the first electrical connector with the second electrical connector; and an electrical socket electrically connected to the electrical conduction means and operable to receive an electrical plug for electrically powering apparatus connected to the plug with electrical power received at the electrical power extension module from one of the first and second another electrical power extension modules. The electrical socket may include an outer collar around the perimeter of the connection point.

The first retaining means may comprise a protruding portion and the second retaining means may comprise a receiving portion operable to receive a protruding portion of the same configuration as the first retaining means. The protruding portion of the first retaining means of one electrical power extension module may combine with the receiving portion of the second retaining means of another electrical power extension module to guide the modules and retain the modules in mechanical engagement.

The protruding portion may comprise a wall-like protrusion at least partially surrounding the first electrical connector and the receiving portion may comprise an aperture corresponding to the protruding portion.

The first electrical connector may comprise pins and the second electrical connector may comprise corresponding recesses for receiving the pins.

The electrical power extension module may have a shallow profile such that the width of the module and the length of the module are large in comparison with the height of the module.

The electrical conduction means may comprises two or more electrical conductor pairs or trios. One of the conductor pairs or trios may provide power to lighting devices and another of the conductor pairs or trios may provide power to devices other than lighting devices.

The conductor pair or trio providing power to lighting devices may have a current capacity which is lower than the current capacity of the conductor pair or trio providing power to devices other than lighting devices.

The electrical power extension module may comprise a lighting strip on an upper surface of the housing.

The lighting strip may be part of a lighting module that comprises: an electrical connection to the electrical conduction means of the power extension module; an internal battery; a driver configured to drive the battery; and one or more lighting apparatuses configured to illuminate in response to receiving power from either the electrical conduction means or the internal battery.

The lighting module may comprise an off-switch. The driver may drive the internal battery in the event of a power failure from the electrical conduction means and the driver may be overridden by the off-switch.

A third aspect of this specification provides an assembly comprising: a power source; a transformer connected to the power source; and a plurality of electrical power extension modules connected to the transformer in series.

BRIEF DESCRIPTION OF THE DRAWINGS

Embodiments of this specification will now be described, by way of example only, with reference to the accompanying drawings in which.

DETAILED DESCRIPTION OF EMBODIMENTS

Briefly, an electrical power extension module according to embodiments described herein is configured to be connectable to other electrical power extension modules via an electrical connection and to be mechanically engageable with the other electrical power extension modules in an assembly via retaining means.

A modular assembly of electrical power extension modules can be constructed on site. The ease with which electrical power can be supplied to an area within a building being constructed is increased due to the convenience of the construction and disassembly of the modular assembly of electrical power extension modules.

The modular assembly can be constructed and installed at the floor level of a construction site, extending the supply of power to areas within the construction site at which power may be required. As such, the requirement for operatives on a construction site to run leads throughout the working area is reduced.

The modular assembly may not be a trip hazard due to its shape, its visibility and the materials it comprises. The safety of providing the power supply is therefore increased.

Figure 1:
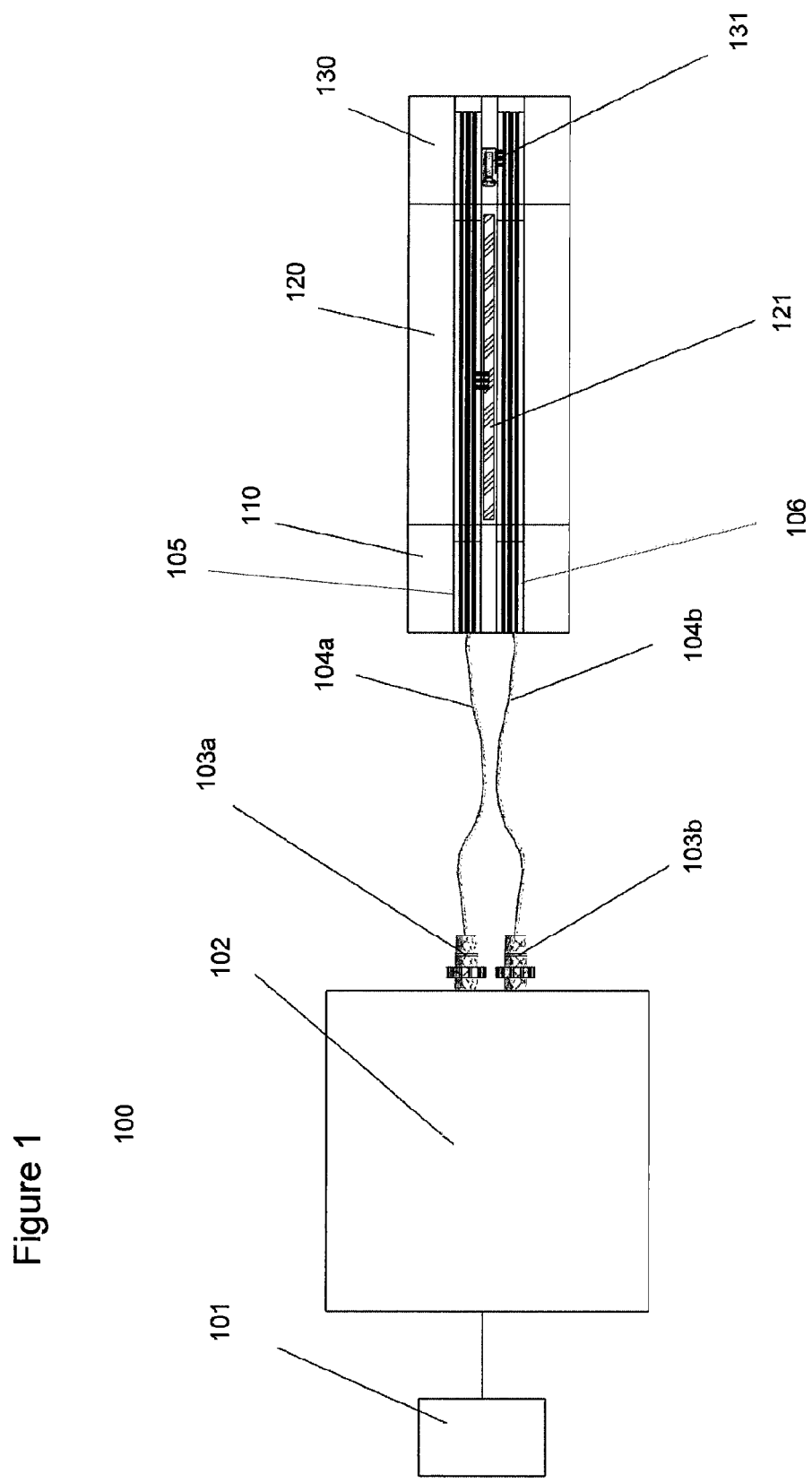
FIG. 1 is a modular assembly of electrical power extension modules including an electrical power extension starter module, an electrical power extension lighting module, and an electrical power extension outlet module.

FIG. 1 shows a modular assembly 100 of electrical power extension modules 110, 120, 130 according to various embodiments.

A modular assembly 100 of electrical power extension modules 110, 120, 130 according to embodiments hereof includes a starter module 110, a lighting module 120 and a power module 130.

The modular assembly 100 is connected to a power source 101 at the starter module 110. The connection between the starter module 110 and the power source 101 includes a transformer 102 which changes the voltage of the power source to a suitable working voltage. In some embodiments, the power source 101 is a mains power supply. In this event, the voltage at the power source 101 is 240V and the transformer 102 is a step down transformer 102 that reduces this voltage to 110V for use at the starter module 110 and throughout the modular assembly 100.

Figure 3:
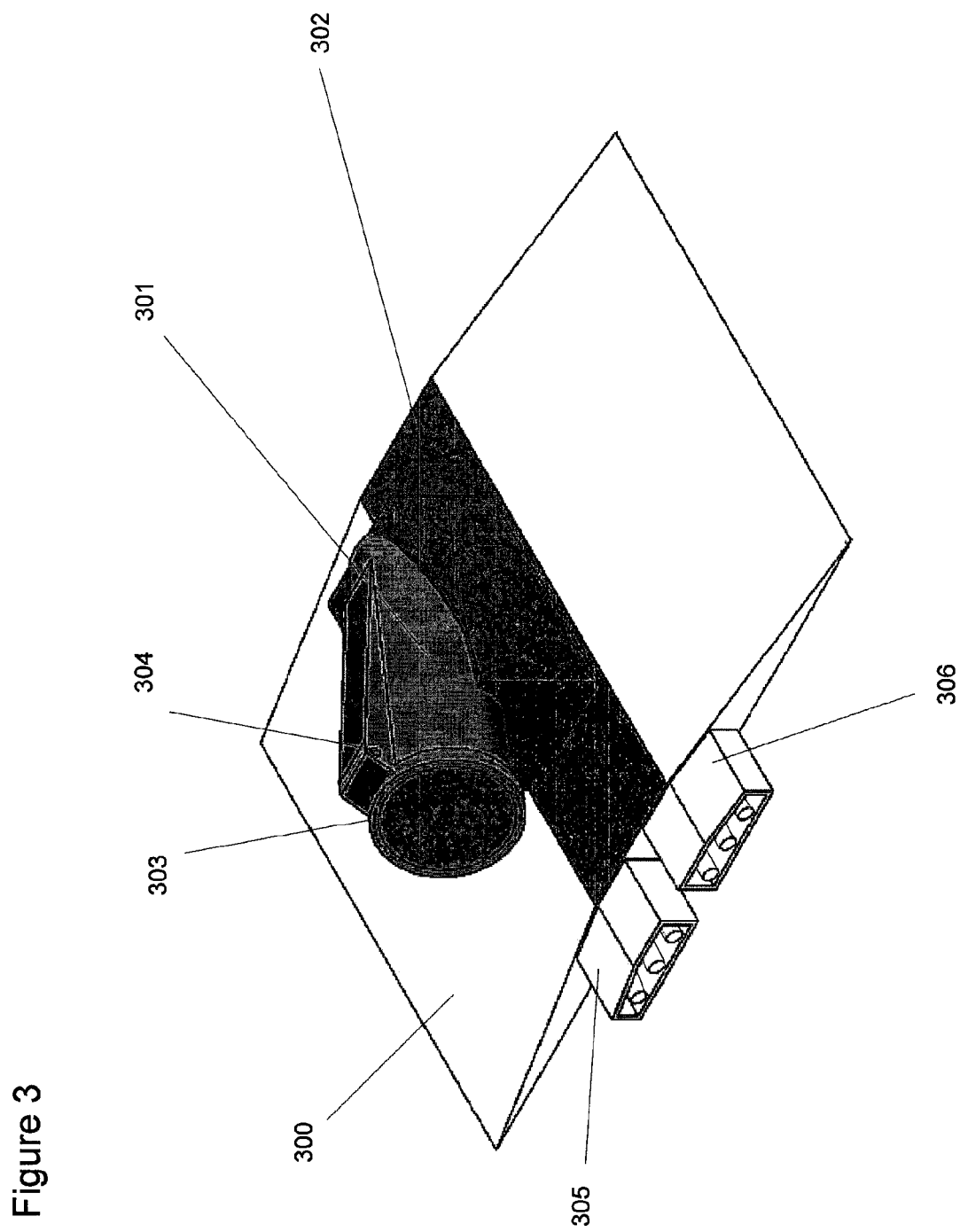
FIG. 3 is an electrical power extension outlet module including an electrical socket, hereinafter referred to as an outlet module.

Each electrical power extension module 110, 120, 130 comprises a housing (illustrated in FIG. 3, for example, for an outlet module 300 having a housing 302). The housing is elongate and non-deformable. Electrical conduction means 105 and 106, hereinafter referred to as conduction means 105 and 106, run through the housing of each electrical power extension module such that the conduction means 105 and 106 are not exposed to the outer environment. The housing therefore protects the conduction means 105 and 106 from damage and protects people working in the area from the risk of electrocution due to exposed conduction means 105 and 106 when the electrical power extension modules are live.

Extending from the conduction means 105 and 106 at ends of the housing, the electrical power extension modules have electrical connectors and retaining means as described below.

The starter module 110 has two wires 104a and 104b which connect to two transformer connectors 103a and 103b. The two wires 104a and 104b are integrated with separate conduction means 105 and 106 within the starter module 110.

At the opposite end of the starter module 110 to the transformer 102, the starter module 110 has two retaining means for mechanical engagement with another electrical power extension module via two retaining means at the another electrical power extension module. For example, as shown in FIG. 1, the starter module 110 may be in mechanical engagement with the lighting module 120.

In more detail, the lighting module 120 includes two separate retaining means provided as two separate protrusions. The starter module 110 includes two separate retaining means provided as two separate apertures which correspond to the two separate protrusions of the lighting module 120.

The two protrusions of the lighting module 120 provide two male engagement points to correspond with the two corresponding female engagement points at the apertures of the starter module 110.

When the starter module 110 and the light module 120 are brought into alignment with one another, they can be mechanically engaged via the respective female and male engagement points. The two modules are then retained in mechanical engagement by a frictional force which arises due to the contact between the inner wall of each aperture of the starter module 110 and the surface of each protrusion of the lighting module 120.

Each subsequent electrical power extension module in the assembly 100 is mechanically engaged with another electrical power extension module via at least one corresponding pair of retaining means.

The retaining means will be described in more detail with reference to FIGS. 4a and 4b.

In some embodiments, the number of retaining means at each end of each electrical power extension module of the assembly 100 is the same as the number of conduction means provided in any given one of the electrical power extension modules. For example, FIG. 1 shows each electrical power extension module 110, 120, 130 having two conduction means 105 and 106 and there may therefore be two retaining means provided at each end of the lighting module 120.

In alternative embodiments, the number of retaining means provided at the ends of each of the electrical power extension modules may be different from the number of conduction means in each module.

At either end of each of the conduction means 105 and 106, electrical connectors are provided. The electrical connectors (not shown in FIG. 1) provide conduction between separate electrical power extension modules upon mechanical engagement of the modules via their respective retaining means. The electrical connectors therefore provide continuous electrical conductivity along the entirety of the assembly and facilitate the supply of power to each module in the assembly.

When the starter module 110 is connected to the power source 101 via the transformer 102, the electrical connectors at the opposite end of the starter module 110 to the transformer become live. As such, when the next electrical power extension module, for example the lighting module 120 in FIG. 1, is connected to the starter module 110, the distance over which power is supplied from the power source 101 is immediately increased.

The electrical connectors at the end of the starter module 110 which connects to the lighting module 120 are provided as embedded female type connectors. As such, they are protected by the housing, which reduces the risk of electrocution due to exposed live components.

Each subsequent electrical power extension module which is added to the modular assembly 100 is also oriented in this way. That is, the electrical power extension modules each comprise male electrical connectors at one end of the module, which protrude from the housing, and female electrical connectors at the other end of the module, which are embedded in the housing. The male electrical connectors are used to initiate connection of the module to the modular assembly 100, and the female electrical connectors are used to await the connection of a subsequent module in the modular assembly 100.

The electrical connectors will be described in more detail in relation to FIGS. 4a and 4b.

The lighting module 120 provides lighting to the construction area via a lighting strip 121. The lighting strip 121 is on an upper surface of the lighting module 120. In some embodiments, the lighting strip 121 is on the ramp profiles. The lighting module 120 will be described in more detail in reference to FIG. 2, in which a lighting module 200 is shown in isolation.

The outlet module 130 provides an outlet by which external apparatus can connect to the power supplied by the power source 101. The outlet is provided as an electrical socket 131 which is integrated with the outlet module 130. The outlet module 130 will be described in more detail in reference to FIG. 3, in which an outlet module 300 is shown in isolation.

Figure 2:
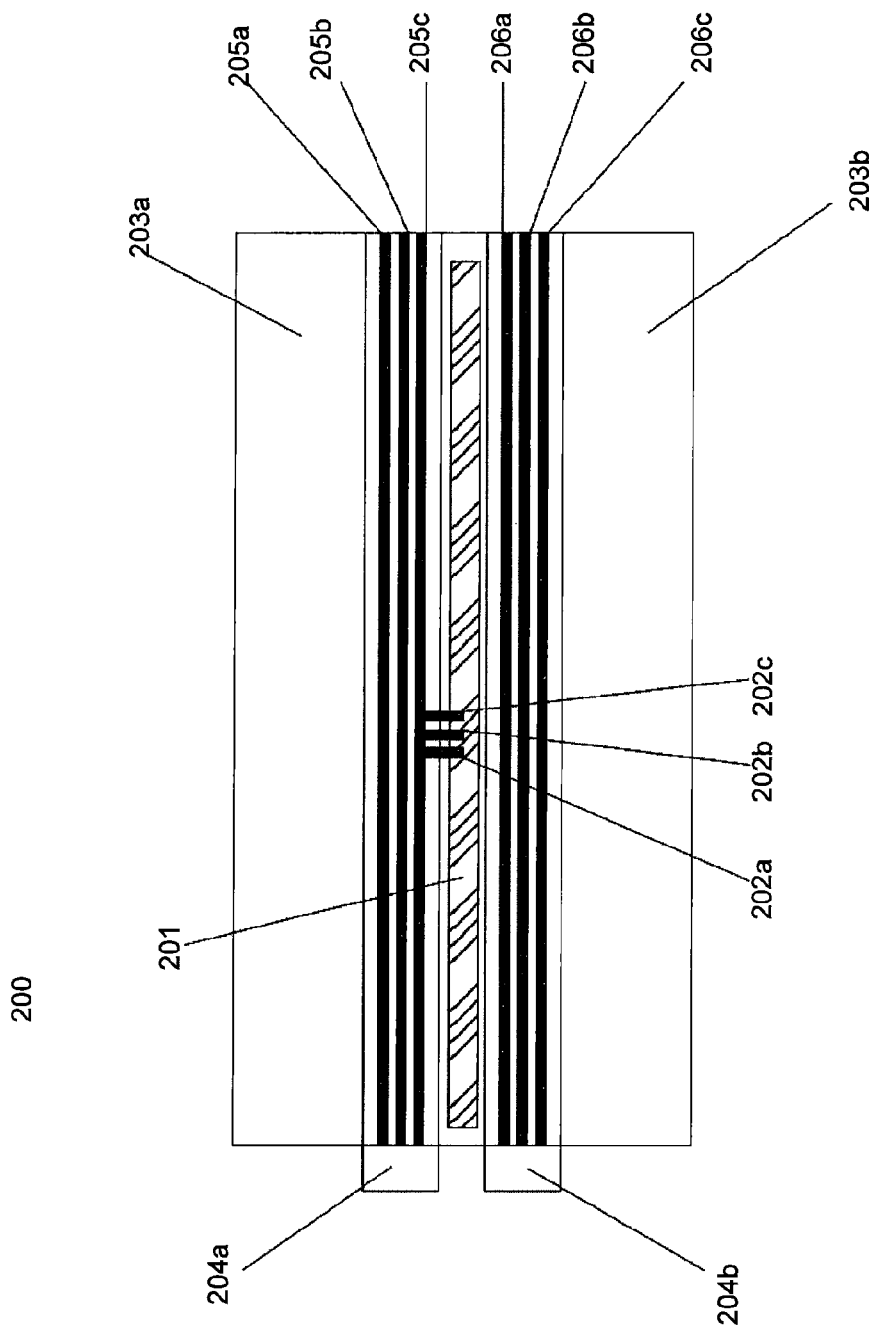
FIG. 2 is an electrical power extension lighting module, hereinafter referred to as a lighting module.

FIG. 2 shows a lighting module in more detail. The lighting module 200 in FIG. 2 comprises a lighting strip 201 along the length of the lighting module 200 from the electrical connectors (not shown) and the retaining means 204a and 204b at one end of the lighting module 200 to the electrical connectors (not shown) and the retaining means (not shown) at the opposite end of the lighting module 200.

The lighting strip 201 may be similar in length to the conduction means or may be shorter than the conduction means. The lighting strip 201 may be provided as a series of light-emitting diodes (LEDs). The LEDs may be disposed on the upper surface of the lighting module 200 and may be provided in a row along the length of the conduction means.

In the case that LEDs are used for the lighting strip 201, a dual strip of LEDs may be provided. A dual strip of LEDs may, for example, comprise two parallel rows of LEDs disposed on the upper surface of the lighting module 200. A dual strip can better serve to meet safety requirements for lighting in in a construction area for example. Alternatively, the lighting strip may comprise any other suitable lighting means.

The lighting strip 201 is illuminated upon receipt of power from the power source 101, via one of the conduction means, for example conduction means 205. As shown in FIG. 2, there is also a separate conduction means 206 which is provided to supply power to devices other than lighting devices and hence does not provide power to the lighting strip 201.

In some embodiments the lighting strip 201 forms part of a lighting module 200 that also comprises an internal battery (not shown) and a driver (not shown) to drive the lighting strip 201. The lighting strip 201 is illuminated upon receipt of power from the battery. As such, the lighting strip 201 remains illuminated when the power supply to the lighting module 200 from the power source 101 is terminated. This may be advantageous in the event of an emergency, whereby the lighting module 200 provides light to the environment even when the power supply from the mains power is not functioning correctly or has ceased functioning altogether.

In some cases, use of the lighting strip 201 for illumination of the surrounding area may not be required during normal use of the modular assembly. This may be because other external lighting apparatus are plugged into the assembly at outlet modules, for example. In such a case, the lighting strip 201 may become illuminated when driven to receive power from the internal battery. Thus, the lighting strip 201 may become illuminated when the power supply from the power source 101 is interrupted. This may also be advantageous in the event of an emergency.

In the event of an emergency, such as a fire, the power may fail or be interrupted. In an emergency, evacuation of personnel from the construction site may be required. The illumination of the lighting strip 201 in the event of a power interruption in such a scenario provides an aid to personnel to successfully exit the construction site by providing necessary lighting to the area.

On occasion, the termination of the power supply will be intentionally initiated by a user. For example, this will occur when the assembly is disassembled for transportation to another site or a module between the power supply and the lighting module is removed in order to alter the configuration of the assembly on the current site. In some embodiments, an off-switch, or override switch, is provided in order that the driver can be overridden and the lighting strip 201 can be switched off. That is, by operation of the off-switch, power from the battery may not be wasted when the power supply has been intentionally terminated.

The conduction means 205 comprises a trio of conducting wires 205a, 205b and 205c. For example, the conduction means 205 may be provided as a sheathed mains electricity cable such as a twin and earth cable. That is, the trio of conducting wires 205a, 205b and 205c, may comprise two individually insulated current carrying conductors 205a and 205c, for example, and a circuit protective conductor 205b. The two current carrying conductors may be a live conductor and a neutral conductor, and the circuit protective conductor may provide a low-resistance path to earth. In some alternative embodiments, the conduction means may be a pair of conducting wires without any earth wire.

The connection between the trio of conducting wires 205a, 205b and 205c and the lighting strip 201 is shown in FIG. 2 as three separate conducting connections 202a, 202b and 202c. Each of these conducting connections may connect one of the conducting wires of the conduction means 205 to the lighting strip 201 such that power may be supplied to the lighting strip 201 for illumination. That is, one of the conducting connections 202a may provide a live connection, one of the conducting connections 202b may provide a neutral connection, and one of the conducting connections 202c may provide an earth connection.

The lighting strip 201 may be provided, as described above, as a series of diodes in parallel between the live and the neutral connections of the conducting connections 202. A circuit breaker and a voltage regulator or a current limiter may be provided additionally in series between the live and the neutral connections of the conducting connections 202. The voltage regulator or current limiter is provided such that a suitable voltage, 3V for example, is present across the diodes or suitable current is allowed to flow through the diodes. The circuit breaker is provided to protect the circuit from damage due to excess current or short circuit.

The separate conduction means 205 and 206 in the lighting module 200 are two separate busbars. The busbars may have different current carrying capacities. For example, the conduction means 205 may be configured to have current carrying capacity of between 1 and 5 amps in order to provide power for lighting via the lighting strip 201. However, this is merely an example and the current carrying capacity of the conduction means 205 is not limited to this range.

In some embodiments, as described in more detail with reference to FIG. 3, the power for separate lighting devices may also be provided by the conduction means 205.

As a further example, the conduction means 206 may be a busbar configured to have a higher current carrying capacity than the busbar of the conduction means 205. This is to provide power for devices other than lighting devices. For example, the conduction means 206 may be configured to have a current capacity of between 20 and 50 amps. However, the current carrying capacity of the conduction means 206 is not limited to this range.

In any case, as there are two separate conduction means, the load required for lighting and power is not shared on one conduction means. As such, the capacity of each conduction means is entirely provided for either lighting or power.

FIG. 3 shows a power extension outlet module 300 including an electrical socket. Power extension outlet module 300 will hereinafter be referred to as an outlet module 300.

In the modular assembly, one or more outlet modules 300 may be included to provide a supply of power to external apparatus within the construction area.

The outlet module 300 includes an electrical socket 301 which facilitates the connection of an external apparatus to one of the lighting conduction means 305 or the power conduction means 306. For example, an outlet module 300 for power may be included in which the electrical socket 301 is connected with the power busbar 306.

For example, returning to FIG. 1, an outlet module 130 is provided in which an electrical socket 131 is connected to the power conduction means 106. The outlet module 130 therefore supplies power to external apparatus which require power to achieve their function in a construction area. Such apparatus may derive power from the mains power supply 101 via the conduction means 106. Advantageously, an outlet module 130 which provides power to external apparatus may be included at any point in the modular assembly, to provide a tailored power supply to any construction area.

In the case of an outlet module such as outlet module 130 in FIG. 1, the lighting conduction means 105 runs undisturbed from one end of the module to the other end of the module. That is, the lighting conduction means 105 is not connected to the electrical socket of an outlet module 130 provided for power devices. Such an outlet module provides a power outlet for external power apparatus other than lighting apparatus, for example.

The outlet module 300 which provides power for external apparatus other than lighting apparatus mitigates the "lull" which occurs in the lighting when devices which require high power are connected to the same conduction means as that providing power to lighting apparatus. Thus, the separate conduction means in FIG. 3 facilitates an uninterrupted and unaffected supply of both lighting and power.

In other embodiments, the electrical socket 301 is instead connected to the lighting conduction means 305. An outlet module 300 in which the electrical socket 301 is connected to the lighting conduction means 305 provides a power outlet for external lighting apparatus. In such an outlet module, the power conduction means 306 runs undisturbed from the male connection at one end of the module to the female connection at the other end of the module. For example, the power conduction means 106 in FIG. 1 is not connected to the electrical socket 131 of an outlet module provided for lighting devices.

An outlet module 300 with an electrical socket 301 which is connected to the lighting conduction means 305 provides power to external lighting apparatus. Advantageously, such a module can be included at any point in the modular assembly, to provide a tailored lighting supply to any construction area.

The electrical socket 301 is provided on an upper surface of the housing 302.

The electrical socket 301 has a protective collar that assists to prevent damage to external apparatus at the point of connection. Damage may occur by the impact of objects or impact due to movement of people in the proximity of the outlet module 300, which may be common on a construction site, for example. Such impact may cause lateral or sheer forces which could deform or otherwise manipulate the components at the connection point. The protective collar may therefore provide a shield against such forces.

The electrical socket 301 is protected by a cap 303 when the electrical socket 301 is not in use. In the closed position, as shown in FIG. 3, the cap 303 protects the electrical socket 301 from damage by insertion of a foreign object and protects the electrical socket 301 from contaminants which may otherwise impair the functionality of the electrical socket 301.

The cap 303 attached to the protective collar of the electrical socket 301 by a hinge 304. The cap 303 is operable to rotate about the hinge 304 between an open position in which the electrical socket 301 may be accessed and a closed position in which the electrical socket 301 is protected. When the cap is in the open position, an external apparatus may be connected to the power supply provided by a conduction means in the outlet module 300.

The lighting module 200 and the outlet module 300, described in reference to FIGS. 2 and 3 respectively, are merely examples of power extension modules which are provided.

In some embodiments, modules are provided for the function of extending the length of the conduction means to increase the reach of the power supply and such modules may have little or no other functionality. Any of the power extension modules are provided in a variety of lengths and shapes.

In some embodiments, a power extension module has a mixture of components such that it provides multiple functionalities. Any of the features described above may be provided in separate modules, or in combination in a single module, according to how and where the module is to be used. For example, a module may be provided with an electrical socket 301 and a lighting strip 201. Indeed, any of the features of, for example, the lighting module 200 and the outlet module 300 may be provided in a single module.

As described above in reference to FIG. 1, the modular assembly 100 is constructed and held together by retaining means at the ends of each of the electrical power extension modules. For example, the retaining means are provided at the ends of the conduction means.

Figure 4A:
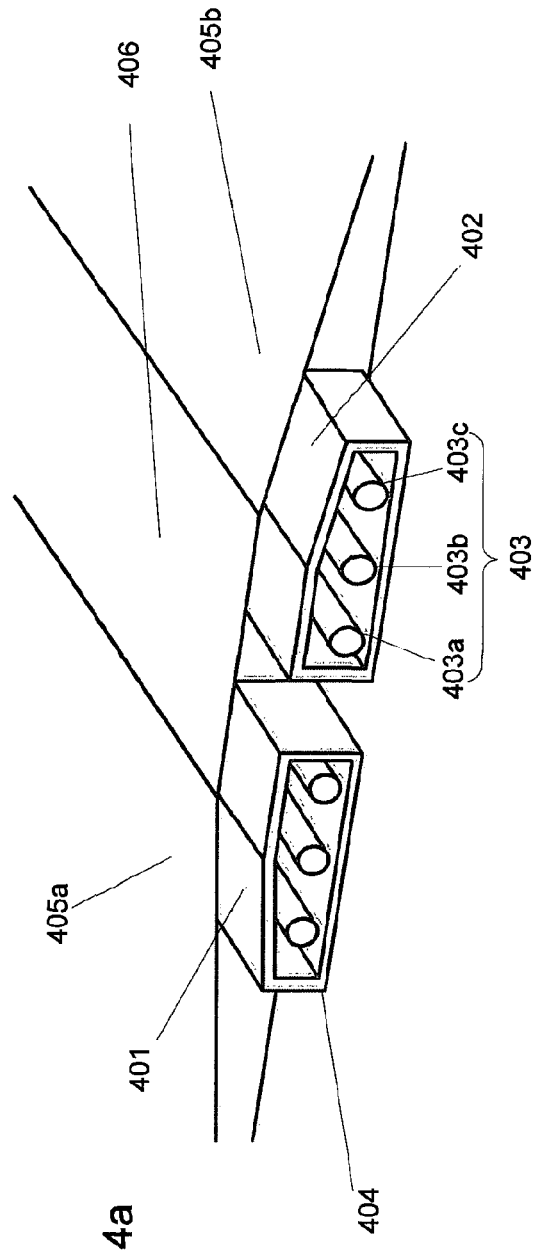
FIGS. 4a and 4b show male and female electrical connectors and retaining means of an electrical power extension module.
Figure 4B:
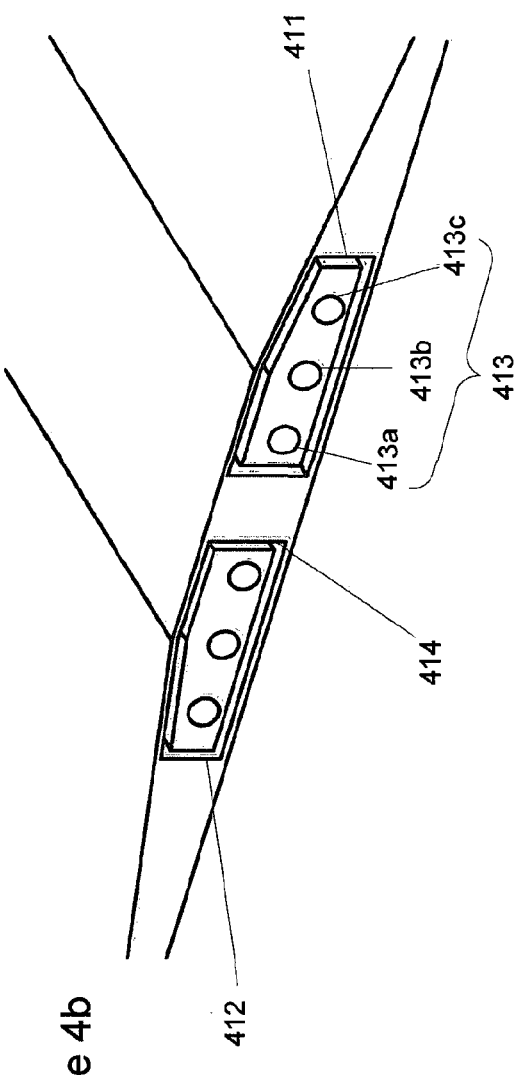

FIGS. 4a and 4b illustrate each of opposite ends of an electrical power extension module according to various embodiments.

FIG. 4a shows a pair of retaining means 401 and 402. The retaining means 401 and 402 are respectively provided at the end of one of the conduction means of the electrical power extension module.

The retaining means 401 and 402 are described as male engagement portions below, as shown in FIG. 4. However, this is merely one option and a number of other possible retaining means may be employed. For example, retaining means comprising a flat surface providing a retaining force by way a reusable, non-tacky adhesive may be used.

The retaining means 401 and 402 as shown in FIG. 4 have a perimeter wall which surrounds the electrical connectors 403a, 403b and 403c, for example. In some embodiments, the retaining means may not fully surround the electrical connectors and may instead be provided as a partially surrounding wall. Alternatively, the retaining means 401 and 402 may be provided as another protrusion.

FIG. 4b shows the retaining means 411 and 412 which correspond to the retaining means 401 and 402. The retaining means 401, 402, 411 and 412 are provided at the opposing ends of each of the electrical power extension modules. The retaining means 401, 402 correspond with the retaining means 411, 412 such that the electrical power extension modules are connectable to each other to form a modular assembly. An example of such a modular assembly is shown in FIG. 1.

The retaining means 411 and 412 are provided at the opposite end of the electrical power extension module to the retaining means 401 and 402. The retaining means 411 and 412 each comprise an aperture which corresponds in shape to the protrusion of the retaining means 401 and 402 respectively.

Although FIGS. 4a and 4b are intended to illustrate two ends of the same electrical power extension module, it will be clear that when constructing the modular assembly the retaining means 401 and 402 are inserted into the corresponding apertures of the retaining means at an end of another electrical power extension module, which is provided as described in reference to and illustrated by the retaining means 411 and 412 in FIG. 4b.

In some embodiments, the retaining means may not comprise a male and female pair. Instead, the retaining means may be provided as, for example, flat surfaces including a suitable reusable, non-tacky adhesive.

In order to facilitate the mechanical engagement of the electrical power extension modules in the modular assembly, retaining means of one electrical power extension module are brought into contact with the retaining means of another electrical power extension module. In embodiments where these retaining means are provided as a male and female pair as shown in FIGS. 4a and 4b, the protrusions of the retaining means of the type shown in FIG. 4a may mate with the corresponding apertures of the retaining means of the type shown in FIG. 4b.

The combination of retaining means may aid the constructor of the modular assembly to align the electrical power extension modules correctly. That is, the retaining means may act as a guide for achieving mutual alignment of the electrical power extension modules.

The retaining means facilitate a simple push-in operation to achieve mechanical engagement of the modules in the assembly. Further, the modules can be easily separated to break the mechanical engagement between modules of the assembly. As such, the configuration of the assembly can be altered without a significant burden to the constructor of the modular assembly. In addition, a module may be removed easily if it is, for example, defective or no longer required.

The electrical connectors 403 shown in FIG. 4A are connected to the conducting means of the electrical power extension module which is as described for the lighting module 200 in reference to FIG. 2 above. Therefore, each of the electrical connectors 403a, 403b and 403c are connected to one of a trio of conducting wires.

Likewise, the electrical connectors 413 shown in FIG. 4B are connected to the conducting means of the electrical power extension module which is as described for the lighting module 200 in reference to FIG. 2 above. Therefore, each of the electrical connectors 413a, 413b and 413c is connected to one of a trio of conducting wires.

The electrical connectors 403 are provided as three protrusions or pins 403a, 403b, 403c. The protrusions or pins of the electrical connectors 403 each provide electrical conductivity of one of the live, neutral and earth conductors between two of the electrical power extension modules. This is achieved by mating the protrusions of the electrical connectors 403a, 403b, 403c with corresponding female-type electrical connectors of another power extension module.

That is, electrical connection of one power extension module is achieved by insertion of electrical connectors of the type shown by pins 403a, 403b, 403c in FIG. 4A into electrical connectors of the type shown by recesses 413a, 413b and 413c in FIG. 4B of another electrical power extension module.

These protrusions or pins are shown in FIG. 4 as cylindrical pins. However, substantially flat (i.e. squashed) pins are also suitable. Alternatively, a number of other shapes of protrusion or pin can be envisaged such as a quadrangular protrusion. In any case, the other end of the module has a recess corresponding to the shape of the protrusion of the electrical connector for receiving the protrusion and establishing electrical connection.

Referring again to FIG. 1, the power extension modules 110, 120, 130 in the modular assembly have a low profile. That is, the height of the module when placed on the floor is small in comparison to the width and the length of the module across the floor. More specifically, the profile of the power extension modules includes two ramp profiles having a shallow gradient and an upper surface which is substantially parallel to the lower surface which is in abutment with the floor in use. As a result, the width of the lower surface is larger than the width of the upper surface.

The shallow gradient of the ramp profiles and the low height of the upper surface of the module from the floor reduces the trip hazard presented by the module to those working or moving in close proximity to the module. This is particularly important on a construction site, when access to the power supply and a supply of lighting are required in close proximity to one another. As such, on site personnel will likely be working and moving around the construction site close to the electrical power extension module. A low profile of the module is therefore desired to reduce instances of tripping.

It will be appreciated that all of the power extension modules have the above-described profile. For example, each of the starter module 110, the lighting module 120 and the outlet module 130 all have a low profile and ramp portions as described above. Such a profile is advantageous to reduce the likelihood of there being a trip hazard associated with the equipment for providing lighting and power.

In the case of the outlet module 130, the electrical socket 131 extends upwards from the upper surface. As such, the outlet module 130 does not have an even upper surface unlike the other modules. Therefore, the outlet module 130 requires more careful installation and planning to ensure it is placed appropriately in the assembly so as not to negate the advantageous effects of the low profile of the modules in the assembly.

The modular assembly comprises modules of equal height such that there are no steps or uneven surfaces which could present a hazard for tripping. Thus, even though the outlet module 130 has an electrical socket 131 protruding from the upper surface of the outlet module 130, the module does not present undue obstruction across its whole width. That is, there is continuity of the height and width of the ramp profiles of all of the modules in the modular assembly.

Figure 5A:
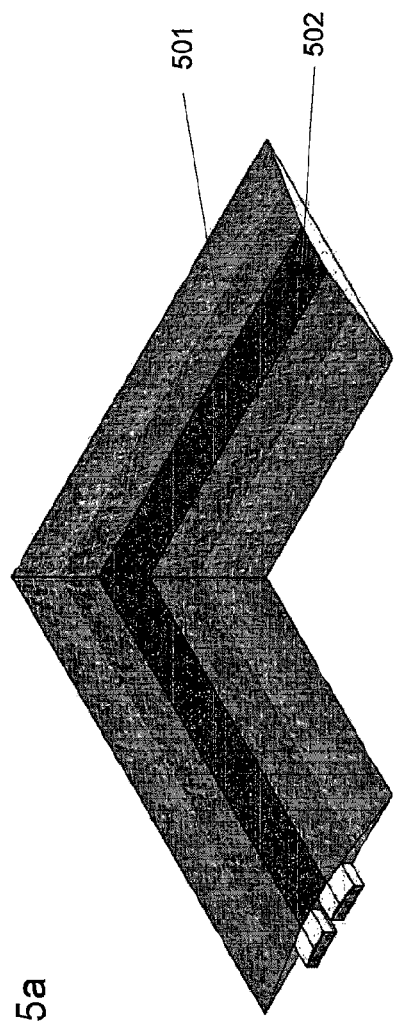
FIGS. 5a and 5b are electrical power extension modules having a corner ("L") shape and a junction ("T") shape respectively.

FIG. 5A shows an electrical power extension module 501 which has a corner ("L") shape. This electrical power extension module 501 will hereinafter be referred to as a corner module 501.

The electrical power extension module in FIG. 5A is right-angled such that the conduction means provides continuous electrical conductivity around a corner from the power supply to a lighting module or outlet module further along the modular assembly.

As described above, the corner module 501 has a low profile. The profile of the corner module 501 includes two ramp profiles having a shallow gradient and an upper surface having a corner shape like that of the module itself.

Figure 5B:
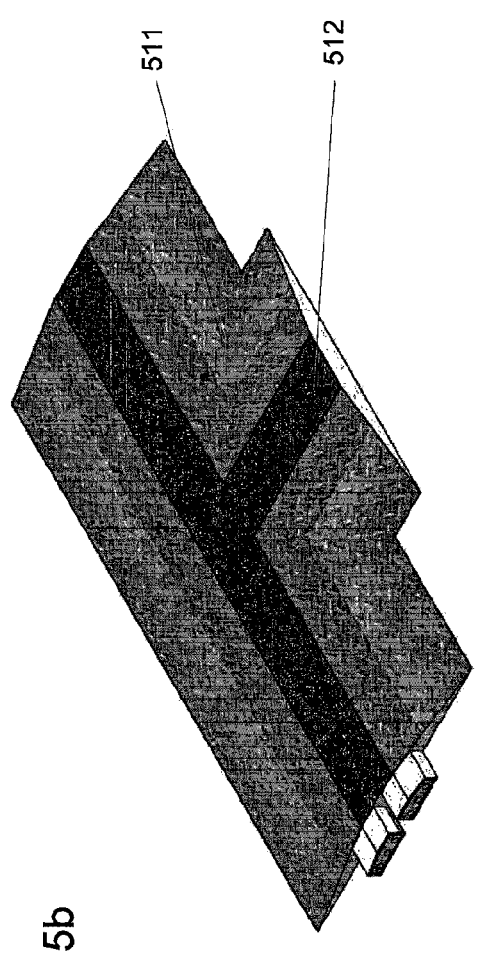

In addition, as can be seen from the shading on the ramp profiles in FIGS. 5A and 5B, the ramp profiles are provided with a textured surface. Such a textured surface includes a series of ridges which provide prevention against slipping on the modules due to, for example, moisture. All of the power extension modules of the modular assembly may be provided with such a textured surface. That is, referring to FIG. 1, the starter module 110, the lighting module 120 and the outlet module 130 all have a textured surface so as not to present a slip hazard.

FIG. 5B shows an electrical power extension module 511 which has a junction ("T") shape. The electrical power extension module in FIG. 5B is T-shaped such that the conduction means is split in two directions to form a junction in the conductive track of the modular assembly at the point where this module is installed. As such, the supply of power can be provided along two separate paths.

The conduction means (not shown) of the junction module 511 in FIG. 5B runs from the electrical connectors 513 and the retaining means 514 at one end of the cross bar of the "T" in a straight line to the other end of the cross bar of the "T" at which it meets electrical connectors (not shown) and retaining means (not shown) which correspond to the electrical connectors 513 and the retaining means 514. That is, when male electrical connectors 513 and retaining means 514 are provided at an end of the housing, female electrical connectors and retaining means are provided at the end of the housing directly opposite in a straight line of conduction means. This allows connection of another module with male connectors at a first end.

Likewise, the electrical connectors and retaining means the end of the upright trunk of the "T" of the junction module (i.e. near to where the reference numeral 512 refers) in the view shown in FIG. 5B are also of the female type in such an example.

In addition, as indicated by the shading in FIGS. 5A and 5B, the housing of the electrical power extension modules are provided in highly visible two-tone block colouring. For example, the module may be provided with a black upper surface and yellow ramp profiles to increase visibility of the module. This further reduces the likelihood that the modules present a trip hazard.

Although electrical power extension modules 501 and 502 of a corner ("L") shape and a junction ("T") shape are depicted in FIGS. 5A and 5B, electrical power extension modules of any other suitable shape may be provided in order to supply power to any area of the construction site.

As mentioned in reference to FIG. 1, the housing of the electrical power extension modules is elongate and non-deformable. The housing of the modules is non-conducting material. Preferably, the housing comprises a plastic base material. For example, the material may be a thermoplastic polymer such as ABS and may be manufactured using injection moulding.

The base of the housing may additionally comprise rubber inserts. This increases the friction resulting from the contact of the base of the housing with the floor. As such, resistance of each module to movement is increased. This may be particularly effective on metal flooring and concrete slabs, both of which often are present on construction sites.

The sizes and particular dimensions of the modules may be of various magnitudes. A range of lengths of the modules ensures the modular assembly can be fully customisable to provide lighting and power at any required location throughout a given site. Some preferable dimensions are included below but alternative dimensions may also be used.

Electrical power extension modules are advantageously between 200 mm and 300 mm in width from the tapered edge of one of the ramp profiles to the tapered edge of the other of the ramp profiles. The substantially flat upper surface (in which lighting or an electrical socket may be provided in the case of a lighting module or an outlet module respectively) may be approximately 50 mm in width, for example.

The length of the module, from the electrical connectors and retaining means at one end of the module and the electrical connectors and retaining means at another end of the module, may vary significantly depending on the type of module provided. For instance, lengths of modules may be between 200 mm and 2400 mm.

The shallow gradient of the ramp profiles may result in a height of the module being approximately 21 mm. However, any suitably low profile of the module may be used such that the conduction means can be integrated into the housing but such that the module is not obstructive when laid along the floor.

Although the modular assembly has been described above as a system to be arranged at floor level, in some cases the modular assembly may be fixed to vertical surfaces, such as walls of the construction site, or hung from a ceiling or soffit in the construction site.

In addition to the electrical conduction means in the modules as described above, the modules may be provided with a communication channel for transferring data along the modular assembly or with fire detection means for detection of fire throughout the construction site.

Also, while the modular assembly has been described in reference to its use on construction site and its subsequent disassembly for reassembly at another location, it will be appreciated that the assembly can be more permanently installed at a location. The system could be used in, for example, garages, gyms, schools or industrial spaces.

The invention claimed is:

1. An electrical power extension module comprising:
   an elongate protective housing;
   a first retaining means for mechanical engagement with a first another electrical power extension module, the first retaining means being located at a first end of the elongate protective housing;
   a first electrical connector located at the first end of the housing, the first electrical connector being configured for electrically connecting with a connector of the first another electrical power extension module;
   a second retaining means for mechanical engagement with a second another electrical power extension module, the second retaining means being located at a second end of the housing;
   a second electrical connector located at the second end of the housing, the second electrical connector being configured for electrically connecting with a connector of the second another electrical power extension module; and
   electrical conduction means located within the housing and connected between the first electrical connector and the second electrical connector and electrically connecting the first electrical connector with the second electrical connector;
   an internal battery;
   a driver configured to drive the battery;
   a lighting strip on the upper surface of the housing and configured to illuminate in response to receiving power from either the electrical conduction means or the internal battery,
   wherein the elongate protective housing has a central portion which houses the electrical conduction means and side portions which include ramp profiles and which provide the housing with a greater width dimension on a lower surface of the housing compared to an upper surface of the housing.

2. The electrical power extension module of claim 1, wherein the ramp profiles comprise a textured surface.

3. The electrical power extension module of claim 1, wherein the housing is substantially non-deformable, and wherein the module further comprises:
   an electrical socket electrically connected to the electrical conduction means and operable to receive an electrical plug for electrically powering apparatus connected to the plug with electrical power received at the electrical power extension module from one of the first and second another electrical power extension modules.

4. The electrical power extension module of claim 3, wherein the electrical socket includes an outer collar around the perimeter of the connection point.

5. The electrical power extension module of any preceding claim, wherein the first retaining means comprises a protruding portion and the second retaining means comprises a receiving portion operable to receive a protruding portion of the same configuration as the first retaining means, wherein the protruding portion of the first retaining means of one electrical power extension module combines with the receiving portion of the second retaining means of another electrical power extension module to guide the modules and retain the modules in mechanical engagement.

6. The electrical power extension module of claim 5, wherein the protruding portion comprises a wall-like protrusion at least partially surrounding the first electrical connector and the receiving portion comprises an aperture corresponding to the protruding portion.

7. The electrical power extension module of any preceding claim, wherein the first electrical connector comprises pins and the second electrical connector comprises corresponding recesses for receiving the pins.

8. The electrical power extension module of any preceding claim, wherein the electrical power extension module has a shallow profile such that the width of the module and the length of the module are large in comparison with the height of the module.

9. The electrical power extension module of any preceding claim, wherein the electrical conduction means comprises two or more electrical conductor pairs or trios and wherein one of the conductor pairs or trios provides power to lighting devices and another of the conductor pairs or trios provides power to devices other than lighting devices.

10. The electrical power extension module of any preceding claim, wherein the conductor pair or trio providing power to lighting devices has a current capacity which is lower than the current capacity of the conductor pair or trio providing power to devices other than lighting devices.

11. The electrical power extension module of claim 3, further comprising an off-switch, wherein the driver drives the internal battery in the event of a power failure from the electrical conduction means and the driver can be overridden by the off-switch.

12. An assembly comprising:
    a power source;
    a transformer connected to the power source; and a plurality of electrical power extension modules according to any of the preceding claims connected to the transformer in series.

* * * * *